(12) United States Patent
Ooshima et al.

(10) Patent No.: US 11,105,414 B2
(45) Date of Patent: Aug. 31, 2021

(54) VEHICLE CONTROL DEVICE

(71) Applicant: ISUZU MOTORS LIMITED, Tokyo (JP)

(72) Inventors: Tatsuya Ooshima, Saitama (JP); Junpei Matsuda, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 30 days.

(21) Appl. No.: 16/613,079

(22) PCT Filed: May 10, 2018

(86) PCT No.: PCT/JP2018/018147
§ 371 (c)(1),
(2) Date: Nov. 12, 2019

(87) PCT Pub. No.: WO2018/207877
PCT Pub. Date: Nov. 15, 2018

(65) Prior Publication Data
US 2020/0200261 A1 Jun. 25, 2020

(30) Foreign Application Priority Data

May 12, 2017 (JP) .............................. JP2017-095974

(51) Int. Cl.
*F16H 59/66* (2006.01)
*F16H 59/68* (2006.01)
(Continued)

(52) U.S. Cl.
CPC ............. *F16H 59/66* (2013.01); *F16H 59/44* (2013.01); *F16H 59/68* (2013.01); *F16H 61/686* (2013.01);
(Continued)

(58) Field of Classification Search
CPC ......... F16H 59/44; F16H 61/686; F16H 59/68
See application file for complete search history.

(56) References Cited

U.S. PATENT DOCUMENTS 5,832,400 A  11/1998 Takahashi et al.
5,931,886 A   8/1999 Moroto et al.
(Continued)

FOREIGN PATENT DOCUMENTS

CN  103552469 A  2/2014
CN  104470750 A  3/2015
(Continued)

OTHER PUBLICATIONS

Office Action for related CN App. No. 201880031411.3 dated Jul. 2, 2020. English translation provided; 11 pages.
(Continued)

*Primary Examiner* — David R Morris
(74) *Attorney, Agent, or Firm* — Procopio, Cory, Hargreaves & Savitch LLP

(57) ABSTRACT

A vehicle control device controls operation of a vehicle provided with a transmission having a direct gear and normal gears including an overdrive gear having a lower gear ratio than the direct gear. The device includes a travel segment determination unit which determines a forward travel segment having a different road slope from a current travel segment, a current gear position selection unit that selects a current gear position in accordance with a shift pattern, a forward gear position selection unit that selects a forward gear position based on a travel resistance of the vehicle in the forward travel segment, and a shift control unit that maintains a gear position as the direct gear while the vehicle travels in the forward travel segment, when a gear
(Continued)

position of the transmission in the current travel segment is the overdrive gear and the forward gear position is the direct gear.

3 Claims, 6 Drawing Sheets

(51) Int. Cl.
    *F16H 59/44*    (2006.01)
    *F16H 61/686*    (2006.01)

(52) U.S. Cl.
    CPC .. *F16H 2059/663* (2013.01); *F16H 2059/666* (2013.01)

(56) References Cited

U.S. PATENT DOCUMENTS

| | | | |
|---|---|---|---|
| 9,365,201 B2* | 6/2016 | Shattuck | B60W 10/06 |
| 9,771,075 B2* | 9/2017 | Jousma | B60W 10/06 |
| 10,330,183 B2* | 6/2019 | McNally | B60K 17/3467 |
| 2008/0245168 A1* | 10/2008 | Heinzelmann | F16H 61/688 74/335 |
| 2013/0304340 A1 | 11/2013 | Shattuck et al. | |
| 2014/0229081 A1* | 8/2014 | Iwase | F16H 59/66 701/51 |
| 2016/0031445 A1 | 2/2016 | Jousma | |
| 2016/0363201 A1 | 12/2016 | McNally et al. | |

FOREIGN PATENT DOCUMENTS

| | | |
|---|---|---|
| CN | 105313878 A | 2/2016 |
| CN | 106246815 A | 12/2016 |
| JP | H08-072591 A | 3/1996 |
| JP | H09-21457 A | 1/1997 |
| JP | 2000-213640 A | 8/2000 |
| JP | 2013-032156 A | 2/2013 |
| JP | 2014-001824 A | 1/2014 |

OTHER PUBLICATIONS

International Search Report and Written Opinion for related International Application No. PCT/JP2018/018147, dated Aug. 7, 2018; English translation of ISR provided (6 pages).

* cited by examiner

VEHICLE CONTROL DEVICE

CROSS-REFERENCE TO RELATED APPLICATIONS

This application is a U.S. National Stage entry of PCT Application No: PCT/JP2018/018147 filed on May 10, 2018, which claims priority to Japanese Patent Application No. 2017-095974, filed May 12, 2017, the contents of which are incorporated herein by reference.

TECHNICAL FIELD

The present disclosure relates to a vehicle control device, and more particularly to a technique of selecting a gear position of a transmission mounted on a vehicle.

BACKGROUND ART

A technique of setting a shift schedule, in which fuel consumption amount on a travel route is minimized, by estimating drive force of a vehicle on a travel route in accordance with road information on a travel route from a current position of the vehicle to a target position and by comparing the estimated drive force with a fuel consumption map stored in advance, has been proposed (see Patent Literature 1).

CITATION LIST

Patent Document

Patent Literature 1: JP-A-H09-21457

SUMMARY OF THE INVENTION

Technical Problem

Large vehicles such as trucks and buses may be provided with a transmission called Automated Manual Transmission (hereinafter, referred to as "AMT"). AMT is a transmission which automatically shifts a gear position of a transmission by moving a single rib in a manual transmission according to the related art by means of an actuator.

The final drive force of the vehicle depends on a gear position selected by the AMT. Here, the AMT is provided with a large number of gears, and resistance of squeezing at each gear position may be different from each other. The difference in resistance of the squeezing at each gear position affects the fuel consumption amount of engines mounted on vehicles. Therefore, it is considered that there is room for improvement in a technique of selecting a gear position based on the fuel consumption amount of the vehicle.

An object of the present disclosure is to provide a vehicle control device which can improve the technique of selecting a gear position in a vehicle provided with an automated manual transmission.

Solution to Problem

The vehicle control device according to the present disclosure is a vehicle control device that controls operation of a vehicle provided with a transmission. The transmission includes: a direct gear that transmits engine power, which is input via an input shaft, to an output shaft not via a counter shaft, and that directly couples the input shaft to the output shaft; and a normal gear that transmits the engine power to the output shaft via the counter shaft, and that includes an overdrive gear having a gear ratio lower than a gear ratio of the direct gear. The vehicle control device includes: a travel segment determination unit that determines a forward travel segment ahead of the vehicle in a travelling direction, the forward travel segment having a road slope different from a road slope of a current travel segment where the vehicle currently travels; a current gear stage selection unit that selects a current gear position, which is a gear position of the transmission in the current travel segment, in accordance with a pre-defined shift pattern; a forward gear position selection unit that selects a forward gear position, which is a gear position of the transmission in the forward travel segment, based on a travel resistance of the vehicle in the forward travel segment estimated based on a road slope of the forward travel segment and a speed of the vehicle; and a shift control unit that maintains a gear position of the transmission as the direct gear while the vehicle travels in the forward travel segment, when a gear position of the transmission in the current travel segment is the overdrive gear and the forward gear position is the direct gear.

The shift control unit may downshift a gear position of the transmission to the direct gear when the vehicle reaches the forward travel segment, and may maintain the gear position of the transmission as the direct gear even in a case where the current gear position selection unit selects the overdrive gear while the vehicle travels in the forward travel segment.

The shift control unit may downshift a gear position of the transmission to the direct gear when the vehicle reaches the forward travel segment, on condition that a road slope in the forward travel segment is an upslope equal to or greater than a predetermined value.

Advantageous Effects of the Invention

According to the vehicle control device of the present disclosure, it is possible to improve a technique of selecting a gear position in a vehicle provided with an automated manual transmission.

DESCRIPTION OF EMBODIMENTS

Summary of the Embodiment

Figure 1:
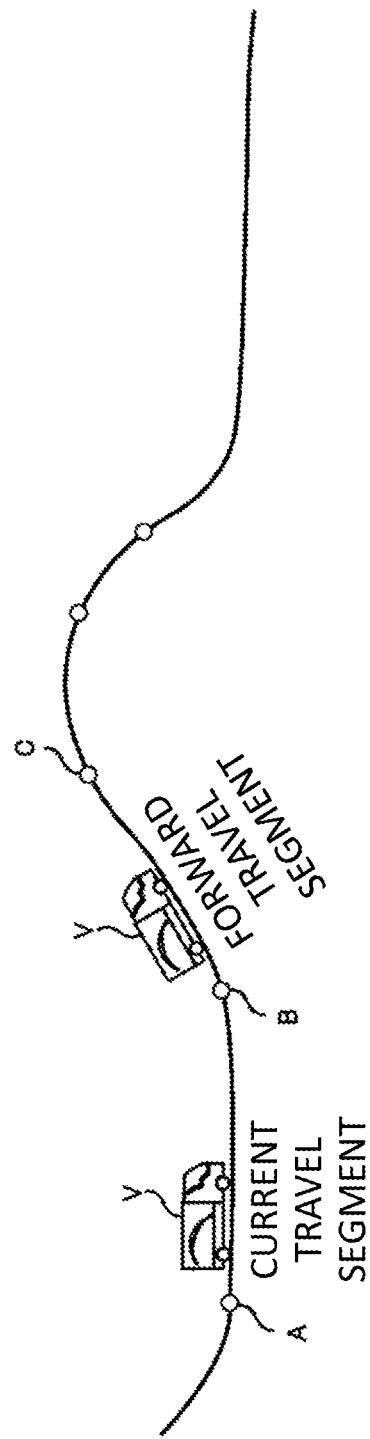
FIG. 1 is a diagram showing an outline of a vehicle according to an embodiment.

FIG. 1 is a diagram showing an outline of a vehicle V according to an embodiment. An outline of the vehicle V according to the embodiment will be described with reference to FIG. 1. The vehicle V according to the embodiment is a large vehicle provided with an AMT, which is driven by an engine such as a diesel engine.

In recent years, a computing device such as an electronic control unit (ECU) mounted on a vehicle has been widely used to automatically select a gear position of a transmission so that a vehicle overcomes travel resistance to travel and fuel consumption of the vehicle is improved. Details will be described below, and the selection of the gear position in the vehicle is performed by selecting, with reference to a fuel consumption contour map of the engine, a gear position improving the fuel consumption of the vehicle from gear positions capable of generating torque which overcomes the travel resistance of the vehicle.

During travelling of the vehicle, an acceleration of the vehicle is proportional to an amount obtained by subtracting travel resistance of the vehicle from drive force of the vehicle, and is inversely proportional to weight of the vehicle. Accordingly, the ECU mounted on the vehicle estimates the travel resistance of the vehicle from the drive force of the vehicle, the weight of the vehicle, and the acceleration of the vehicle, and selects a gear position capable of generating a torque which overcomes the travel resistance. However, when the ECU estimates the travel resistance using the acceleration of the vehicle, the ECU can estimate the travel resistance of the vehicle at a currently traveling position, but cannot estimate the travel resistance at a position ahead of the currently traveling position.

When the ECU determines the travel resistance by estimation, calculation accuracy of the travel resistance is not necessarily high. Therefore, a gear position is selected based on the travel resistance whose accuracy is not necessarily ensured, and thus it is not necessarily ensured that the selected gear position is a gear position which improves the fuel consumption of the vehicle. Therefore, the ECU of the vehicle V according to the embodiment estimates the travel resistance at a forward position by acquiring slope information of a road at the position ahead of the currently traveling position. A summary of a method for estimating the travel resistance at the forward position by acquiring slope information by means of the vehicle V according to the embodiment will be described below.

The vehicle V according to the embodiment has a satellite navigation function of acquiring position information showing a current position of the vehicle V based on information received from a navigation satellite. In addition, the vehicle V stores slope information of a road on which the vehicle V travels. The vehicle V may have an autonomous navigation function of acquiring a current position of the vehicle V based on an output value of an acceleration sensor or the like without using the information received from the navigation satellite.

The ECU of the vehicle V prefetches, based on the slope information of the road and the position information of the vehicle V, slope information of a road on which the vehicle V will travel in the near future. In FIG. 1, the vehicle V is traveling in a "current travel segment" having a point A as a start point and a point B as an end point. In the example shown in FIG. 1, a road on which the vehicle V is traveling is an upslope above a certain level in a "forward travel segment" having the point B as a start point and a point C as an end point. The "forward travel segment" is a travel segment whose average slope of the road is different from that of the current travel segment on which the vehicle V is currently traveling, and is a travel segment ahead of the vehicle V in a travelling direction.

The slope information of the forward travel segment prefetched by the ECU is determined from the slope information stored by the vehicle V and the position information of the vehicle V. The travel resistance of the vehicle V is dominated by slope resistance, air resistance, and rolling resistance, and the slope resistance among the above resistance can be estimated. As a result, the ECU can estimate the travel resistance of the forward travel segment.

The fuel consumption of the vehicle V is not only affected by specific fuel consumption (that is, the amount of fuels consumed by an engine to generate predetermined drive force) of an engine provided in the vehicle V, but also affected by sliding resistance inside the engine or a loss in a power transmission path of the engine. Here, the loss in the power transmission path of the engine is, for example, a loss caused by transmission efficiency of each gear provided in the transmission.

Therefore, the vehicle V according to the embodiment refers to a fuel consumption contour map in consideration of the transmission efficiency of each gear provided in the transmission when a gear in the forward travel segment is to be selected. As a result, the vehicle V according to the embodiment can more accurately select a gear position having a high fuel consumption in the forward travel segment.

When the vehicle V is traveling on an automobile-only road such as a highway, the vehicle V changes, according to various traveling environments where the vehicle V is placed, presence or absence of a shift to the gear position selected by the prefetching. As a result, an uncomfortable feeling, which can be given to a driver due to the shift of the vehicle V, can be reduced.

<Configuration of Vehicle V According to Embodiment>

An internal configuration of the vehicle V according to the embodiment will be described with reference to FIG. 2.

Figure 2:
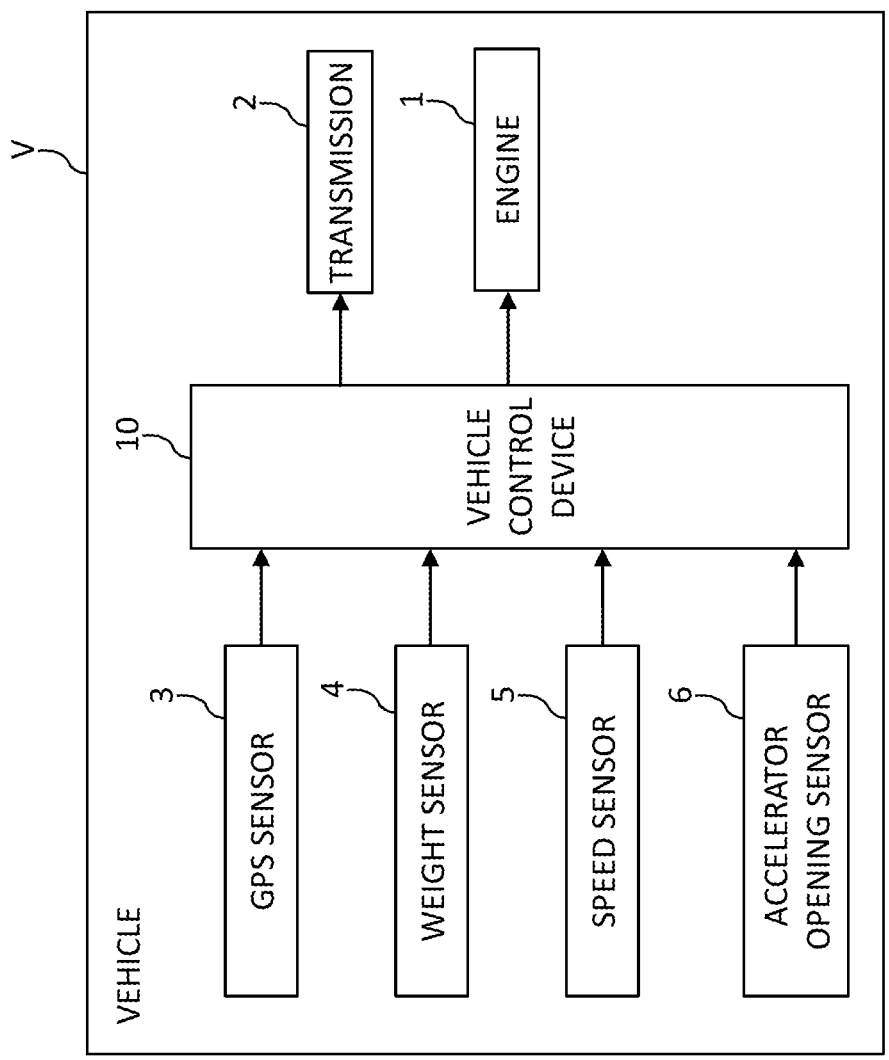
FIG. 2 is a diagram schematically showing an internal configuration of the vehicle according to the embodiment.

FIG. 2 is a diagram schematically showing an internal configuration of the vehicle V according to the embodiment. The vehicle V according to the embodiment includes an engine 1, a transmission 2, a global positioning system (GPS) sensor 3, a weight sensor 4, a speed sensor 5, an accelerator opening sensor 6, and a vehicle control device 10 as the ECU.

The vehicle V is a large vehicle which uses the engine 1, such as a diesel engine, to provide drive force, and is, in particular, a vehicle has an automatic cruise mode. The transmission 2 is an AMT for transmitting rotational drive force of the engine 1 to a drive wheel (not shown) of the vehicle V. The transmission 2 includes a plurality of positions of gears for converting the rotational drive force of the engine 1.

Here, the "automatic cruise mode" in the vehicle V refers to a mode in which the engine 1, the transmission 2, and the like are automatically controlled by the ECU so as to maintain a speed of the vehicle V set in advance even if the driver does not operate the accelerator or a shift lever. It is mainly assumed that the automatic cruise mode is used when the vehicle V travels on a highway.

The GPS sensor 3 receives and analyzes radio waves transmitted from a plurality of navigation satellites, so as to acquire a position of the GPS sensor 3, that is, a position of the vehicle V on which the GPS sensor 3 is mounted. The GPS sensor 3 outputs information indicating the position of the vehicle V to the vehicle control device 10.

The weight sensor 4 acquires total weight of the vehicle V. Specifically, the weight sensor 4 acquires the total weight of the vehicle V by measuring weight of a load of the vehicle V and adding up the weight of the load and weight of the vehicle V alone excluding the load. The weight sensor 4 outputs information indicating the total weight of the vehicle V to the vehicle control device 10.

The speed sensor 5 measures the speed of the vehicle V. The speed sensor 5 outputs information indicating the measured speed to the vehicle control device 10. The accelerator opening sensor 6 measures an accelerator opening degree which is a press-down amount of a pedal of an accelerator by a driver of the vehicle V. The accelerator opening sensor 6 outputs information indicating the accelerator opening degree to the vehicle control device 10.

The vehicle control device 10 acquires information from each of the sensors described above, and controls, based on the acquired information, the amount of fuels to be supplied to a cylinder in the engine 1 and the gear positions of the transmission 2. When the vehicle V is in the automatic cruise mode, the vehicle control device 10 controls the engine 1 and the transmission 2 so that the vehicle V travels at a set speed. In addition, when a speed limit device (SLD) of the vehicle V (not shown) is operating, the vehicle control device 10 controls the engine 1 and the transmission 2 so that the speed of the vehicle V does not exceed the set maximum speed.

Figure 3:
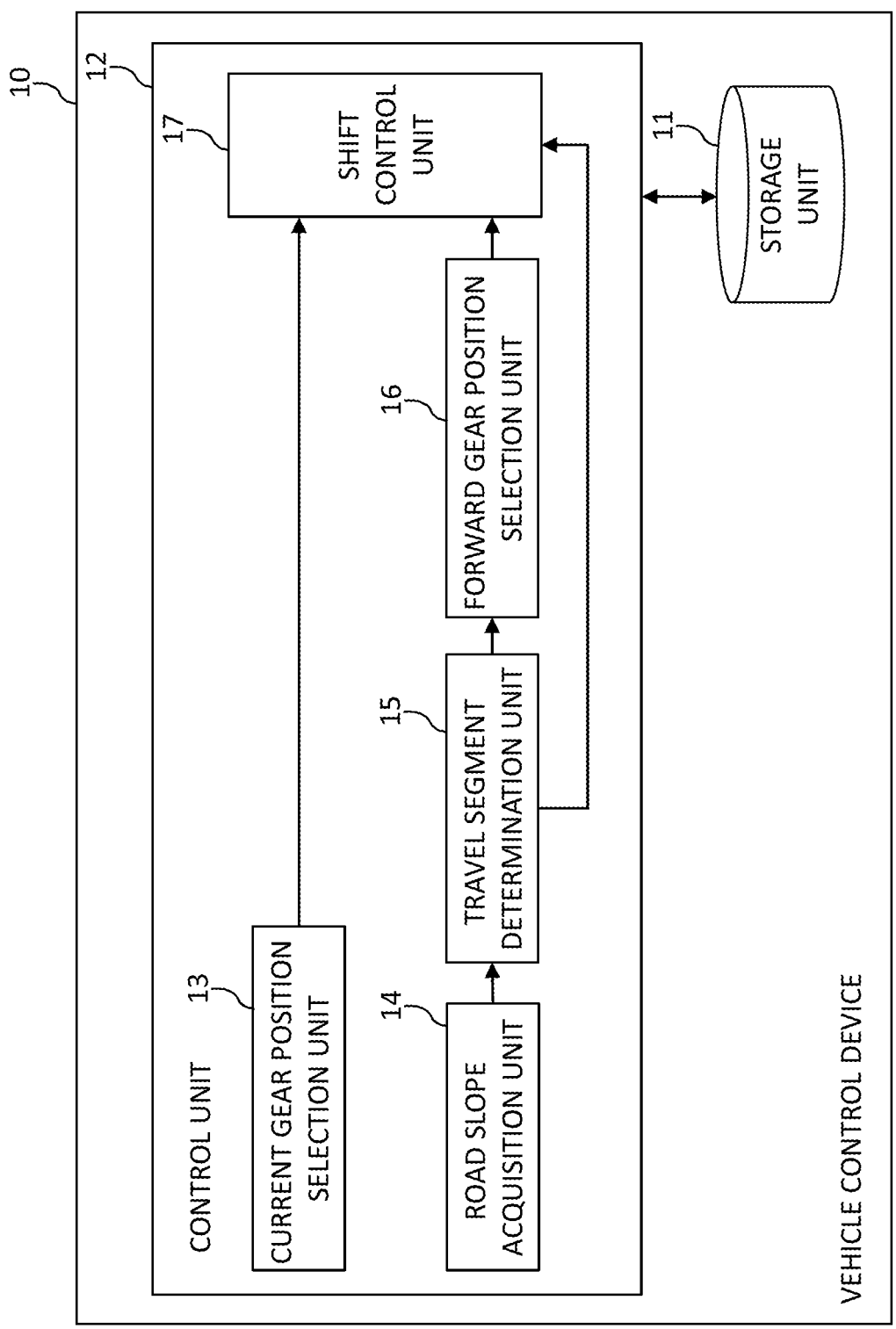
FIG. 3 is a diagram schematically showing a functional configuration of a vehicle control device according to the embodiment.

FIG. 3 is a diagram schematically showing a functional configuration of the vehicle control device 10 according to the embodiment. The vehicle control device 10 according to the embodiment includes a storage unit 11 and a control unit 12.

The storage unit 11 is, for example, a read only memory (ROM), or a random access memory (RAM). The storage unit 11 stores various programs for causing the control unit 12 to function. The storage unit 11 may store map information, and may store information indicating a road slope of a road.

The control unit 12 is a computational resource such as a central processing unit (CPU; not shown). The control unit 12 achieves functions of a current gear position selection unit 13, a road slope acquisition unit 14, a travel segment determination unit 15, a forward gear position selection unit 16, and a shift control unit 17 by executing a program stored in the storage unit 11.

The current gear position selection unit 13 selects a current gear position, which is a gear position of the transmission 2 in the segment where the vehicle V is traveling, based on an estimated value of the travel resistance of the vehicle V on the road on which the vehicle V is currently traveling. Details of the current gear position selection by the current gear position selection unit 13 will be described below.

The road slope acquisition unit 14 acquires, based on the information indicating the position of the vehicle V acquired from the GPS sensor 3 and the map information stored in the storage unit 11, a road slope on the road on which the vehicle V is currently traveling.

The travel segment determination unit 15 determines, based on the road slope acquired by the road slope acquisition unit 14, a forward travel segment ahead of the vehicle V in the travelling direction, which is a travel segment with an average road slope different from that of the current travel segment where the vehicle V is currently travelling, by a predetermined value or more.

The forward gear position selection unit 16 selects a forward gear position, which is a gear position of the transmission 2 in the forward travel segment, based on the road slope of the forward travel segment and the speed of the vehicle V. Hereinafter, details of the forward gear position selection by the forward gear position selection unit 16 will be described together with the current gear position selection by the current gear position selection unit 13.

In order to acquire the slope information of the road on which the vehicle V will travel in the future, the road slope acquisition unit 14 must estimate a place where the vehicle V will travel in the future. When the road slope acquisition unit 14 cannot acquire the road slope, the forward travel segment by the travel segment determination unit 15 is hardly determined.

When the vehicle V travels on an automobile-only road such as a highway, the road slope acquisition unit 14 is relatively easy to estimate the place where the vehicle V will travel in the future. In contrast, when the vehicle V travels on a road including many branches such as a general road and an urban area, the road slope acquisition unit 14 hardly estimates the place where the vehicle V will travel in the future.

As described above, while the vehicle V is currently traveling on a general road, an urban area, or the like, the vehicle V travels in accordance with the gear selection via the current gear position selection unit 13. When the vehicle V travels on an automobile-only road such as a highway, the shift control unit 17 acquires a gear selection result by the current gear position selection unit 13 and a gear selection result by the forward gear position selection unit 16. The shift control unit 17 controls a shift of the gear position of the transmission 2 based on the gear selection result by the current gear position selection unit 13 and the gear selection result by the forward gear position selection unit 16.

Hereinafter, the transmission 2 will be described first, and then a relationship between a gear position and fuel consumption will be described. The shift transmission control by the shift control unit 17 will be described below.

[Transmission 2 According to the Embodiment]

The transmission 2 provided in the vehicle V according to the embodiment is an AMT, and is a transmission which achieves automatic transmission of a gear position of the transmission 2 by moving a single rib in a manual transmission according to the related art by an actuator. Therefore, a basic structure of the transmission 2 according to the embodiment is similar to that of a manual transmission according to the related art. The transmission 2 according to the embodiment includes two sub transmission mechanisms called a splitter and a range, and one main transmission mechanism provided between the splitter and the range.

The splitter changes a gear ratio between an input shaft, which receives power of the engine of the vehicle V, and a counter shaft. The main transmission mechanism mainly changes a gear ratio between a counter shaft and an output shaft. The range is provided on a driving transmission path for transmitting the rotational driving of an output shaft to a propeller shaft, and changes a gear ratio between the output shaft and the propeller shaft. The main transmission mechanism is provided with a "direct gear" directly coupling the input shaft to the output shaft.

In the transmission 2 of the vehicle V according to the embodiment, gear stages of the splitter, the main transmission mechanism, and the range are, for example, two stages, three stages, and two stages, respectively. That is, the transmission 2 provided in the vehicle V according to the embodiment is a 12-stage (2 stages×3 stages×2 stages=12 stages) transmission. If the 12th-stage gear (overdrive gear) or the 11th-stage gear (direct gear) is selected as a gear of the transmission 2 when the vehicle V travels around a highway with a small slope, the fuel consumption of the vehicle V may be always increased.

The direct gear is a gear which directly couples the input shaft to the output shaft. Since the power of the engine is directly transmitted to the output shaft not via the counter shaft, the transmission efficiency is higher than those of other gear positions via the countershaft. Even when the gear position of the transmission 2 is the five stage, the main transmission mechanism becomes a direct gear. However, a gear ratio of the range in this case does not become direct coupling (gear ratio: 1), and the transmission efficiency is decreased. Hereinafter, in the present specification, the gear position of the transmission 2 is defined such that the "overdrive gear" means a gear at the highest stage of the transmission 2, and the "direct gear" means a gear at a stage lower than the highest stage of the transmission 2 by one stage.

[Relationship Between Gear Position and Fuel Consumption]

Figure 4:
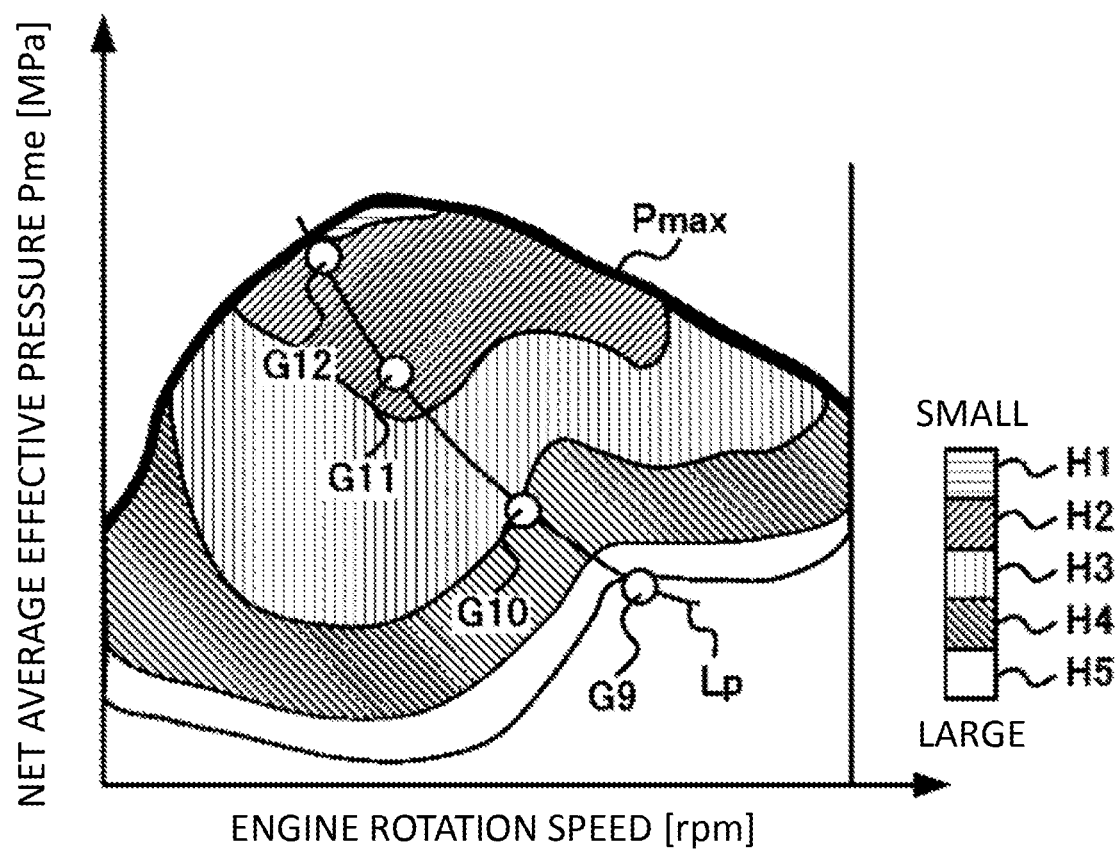
FIG. 4 is a graph schematically showing an example of a fuel consumption contour map of an engine according to the embodiment.

FIG. 4 is a diagram schematically showing an example of a fuel consumption contour map of the engine 1 according to the embodiment. Hereinafter, the gear selection in the transmission 2 will be described with reference to FIG. 4.

In the fuel consumption contour map shown in FIG. 4, a vertical axis indicates net average effective pressure Pme of a cylinder provided in the engine 1, and a horizontal axis indicates a rotation speed N of the engine 1. Torque T of the engine 1 is obtained by multiplying the net average effective pressure Pme by a predetermined value determined by the exhaust amount of the engine 1. That is, the net average effective pressure Pme is proportional to the torque T generated by the engine 1. When a proportional coefficient is $\alpha$, $T=\alpha$ Pme.

In the fuel consumption contour map shown in FIG. 4, a curve indicated by a symbol "Pmax" is the maximum combustion pressure curve "Pmax" which indicates the maximum combustion pressure of the engine 1. The engine 1 cannot generate torque exceeding the maximum combustion pressure curve "Pmax" in the fuel consumption contour map shown in FIG. 4.

In the fuel consumption contour map shown in FIG. 4, an area indicated by hatching shows specific fuel consumption (SFC) of the engine 1. SFC indicates the fuel consumption amount per unit work of the engine 1. The smaller the SFC value is, the less fuel with which the engine 1 can do the same work.

In the fuel consumption contour map shown in FIG. 4, areas having different specific fuel consumption are identified using hatching. In FIG. 4, an area denoted by hatching H1 indicated by the symbol H1 is an area with the best specific fuel consumption (that is, the fuel consumption amount is small), and thereafter, the specific fuel consumption deteriorates in an order of hatching H2, hatching H3, hatching H4, and hatching H5. In FIG. 4, an illustration of an area where the specific fuel consumption is worse than the area denoted by the hatching H5 is omitted. Hereinafter, the area denoted by the hatching H1 is simply written as an area H1. The same applies to other areas.

In order for the vehicle V to overcome the travel resistance and travel at a constant speed Vc, force F generated by the torque T generated by the vehicle V must countervail the travel resistance of the vehicle V. In this case, the engine 1 of the vehicle V is required to output travel resistance horsepower Pv=F Vc. In the fuel consumption contour map shown in FIG. 4, a curve indicated by a symbol Lp is a constant horsepower curve Lp corresponding to the travel resistance horsepower Pv=F Vc.

When the engine 1 rotating at rotation speed N generates torque T, the horsepower P output by the engine 1 is P=T N=$\alpha$ Pme N. Therefore, the net average effective pressure (Pme) is inversely proportional to the rotation speed N of the engine 1. Here, the rotation speed N of the engine 1 is determined by a gear ratio of the gear position selected by the transmission 2. Therefore, the engine 1 cannot reach any rotation speed on the constant horsepower curve Lp in an fuel consumption contour map, and is regulated to a discrete rotation speed determined by the speed Vc and the gear ratio of the transmission 2.

In FIG. 4, a white circle G12 indicated by a symbol G12 shows a state of the engine 1 in a case where the gear position of the transmission 2 is the 12th stage (that is, an overdrive gear). Similarly, white circles indicated by the symbols G11, G10, and G9 show states of the engine 1 in the cases where the gear position is the 11th stage (that is, a direct gear), the 10th stage, and the 9th stage, respectively. In a case where the gear position of the transmission 2 are the 12th stage and the 11 stage, both are contained in the area H2. However, in the case where the gear position is the 12th stage, the state of the engine 1 is closer to the area H1 and the fuel consumption is good.

As described above, when the speed Vc of the vehicle V and the travel resistance horsepower Pv of the vehicle V are determined, the current gear position selection unit 13 and the forward gear position selection unit 16 can define a gear position with good fuel consumption with reference to the fuel consumption contour map.

[Selection of Gear Position by the Current Gear Position Selection Unit 13]

The current gear position selection unit 13 estimates an estimated value Pv of the travel resistance of the vehicle V on the road on which the vehicle V is currently traveling. The current gear position selection unit 13 further refers to the fuel consumption contour map using the speed of the vehicle V and the estimated value Pv of the travel resistance to select the gear position of the transmission 2.

As described above, the acceleration of the vehicle V during travelling of the vehicle V is proportional to an amount obtained by subtracting the travel resistance of the vehicle from the drive force of the vehicle V, and is inversely proportional to the weight of the vehicle V. The current gear position selection unit 13 estimates the net average effective pressure Pme, which is generated by the engine 1, from the injection amount of fuels injected to the engine 1. The current gear position selection unit 13 acquires the torque T, which is generated by the engine 1, from the net average effective pressure Pme. The current gear position selection unit 13 acquires the drive force of the vehicle V from the torque T, the gear ratio of the selected gear position in the transmission 2, the final reduction ratio, and a diameter of the drive wheel. The current gear position selection unit 13 estimates the travel resistance of the vehicle V from the drive force of the vehicle V, the weight of the vehicle V, and the acceleration of the vehicle V, and selects a gear position with reference to the fuel consumption contour map.

[Selection of Gear Position by the Forward Gear Position Selection Unit 16]

The forward gear position selection unit 16 differs from the current gear position selection unit 13 in that the travel resistance of the vehicle V is calculated by calculation. Here, the travel resistance of the vehicle V is dominated by the sum of rolling resistance of the drive wheel of the vehicle V, the air resistance of the vehicle V, and the slope resistance of the road on which the vehicle V travels. The air resistance of the vehicle V is proportional to the square of the speed of the vehicle V. The slope resistance of the road depends on the slope of the road on which the vehicle travels and the weight of the vehicle V. The rolling resistance of the drive wheel and the proportional coefficient for calculating the air resistance of the vehicle V are stored in the storage unit 11 by a manufacturer of the vehicle V in advance.

The forward gear position selection unit 16 refers to the map information stored in the storage unit 11, and acquires the slope information of the forward travel segment determined by the travel segment determination unit 15. The forward gear position selection unit 16 acquires the weight of the vehicle V and the speed of the vehicle V from the weight sensor 4 and the speed sensor 5, respectively. As a result, the forward gear position selection unit 16 calculates the slope resistance of the vehicle V in the forward travel segment.

The forward gear position selection unit 16 acquires the air resistance of the vehicle V by multiplying the square of the speed of the vehicle V by a proportional coefficient. The forward gear position selection unit 16 calculates the travel resistance of the vehicle V by adding up the slope resistance of the vehicle V, the air resistance of the vehicle V, and the rolling resistance read from the storage unit 11. Similar to the current gear position selection unit 13, the forward gear position selection unit 16 selects a gear position in the forward travel segment from the calculated travel resistance and the fuel consumption contour map.

Here, the forward gear position selection unit 16 refers to different fuel consumption contour maps in a case where the gear position of the transmission 2 is a direct gear and in a case where the gear position of the transmission 2 is a normal gear to select the forward gear position.

Figure 5A:
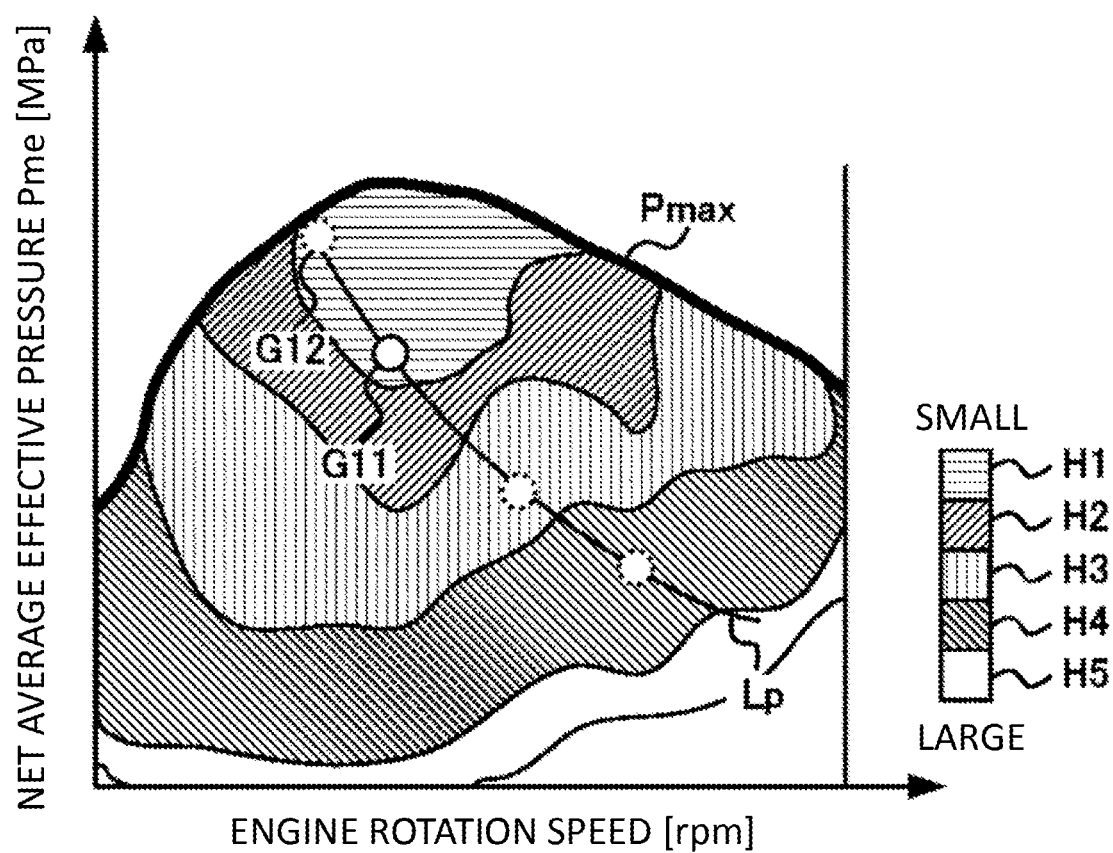
FIG. 5A is a graph schematically showing an example of a fuel consumption contour map of a direct gear.
Figure 5B:
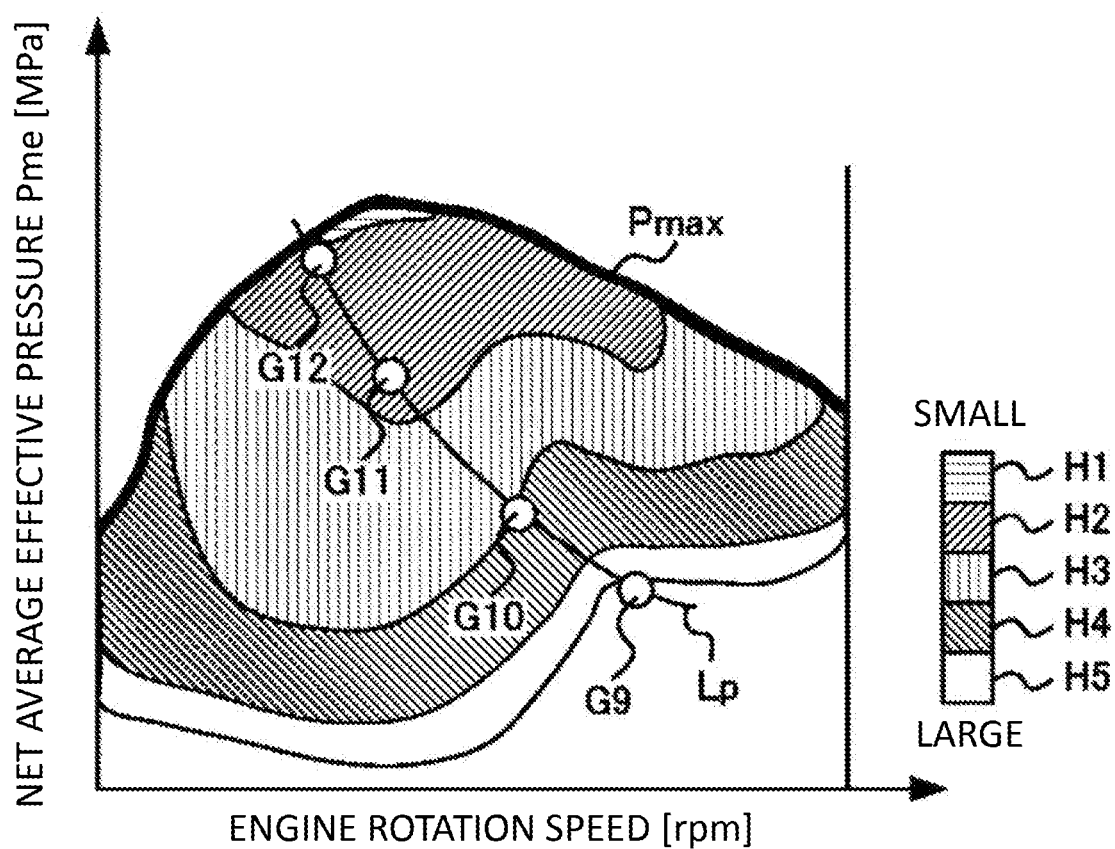
FIG. 5B is a graph schematically showing an example of a fuel consumption contour map of a normal gear.

FIGS. 5A and 5B are diagrams showing a difference between a fuel consumption contour map of a normal gear and a fuel consumption contour map of a direct gear. Specifically, FIG. 5A is a diagram schematically showing an example of a fuel consumption contour map of a direct gear. FIG. 5B is a diagram schematically showing an example of a fuel consumption contour map of a normal gear. The fuel consumption contour map shown in FIG. 5B is the same as the fuel consumption map shown in FIG. 4. In other words, the white circle G12 in the fuel consumption contour map of the normal gear shown in FIG. 5B shows a state of the engine 1 in the case of an overdrive gear in which the gear position of the transmission 2 is the 12th stage.

As described above, the transmission efficiency of the gear of the entire transmission 2 is increased in the case where the gear position of the transmission 2 is a direct gear, as compared with the case where the gear position of the transmission 2 is a normal gear. Therefore, a transmission loss, which occurs before the output of engine 1 is transmitted to the drive wheels of vehicle V, is reduced in the case where the gear position of the transmission 2 is a direct gear, as compared with the case where the gear position of the transmission 2 is a normal gear. As a result, the specific fuel consumption of the engine 1 is improved in the case where the gear position of the transmission 2 is a direct gear, as compared with the case where the gear position of the transmission 2 is a normal gear.

When the fuel consumption contour map of the direct gear shown in FIG. 5A is compared with the fuel consumption contour map of the normal gear shown in FIG. 5B, the area H1 in an area below the maximum combustion pressure curve Pmax in the fuel consumption contour map of the direct gear is wider. Therefore, a part which is the area H2 in the fuel consumption contour map of the normal gear also becomes the area H1 in the fuel consumption contour map of the direct gear.

A constant horsepower curve Lp shown in FIG. 5A is the same as a constant horsepower curve Lp shown in FIG. 5B. As shown in FIG. 5A, the state of the engine 1 in the direct gear (the 11th stage) in the constant horsepower curve Lp is contained in the area H1. This situation means that, in order to make the engine 1 to perform operation corresponding to the constant horsepower curve Lp, the fuel consumption of the vehicle V is improved in a case where the transmission 2 adopts a direct gear, as compared with a case where the transmission 2 adopts a normal gear called an overdrive gear.

As described above, the forward gear position selection unit 16 selects a gear position with reference to the fuel consumption contour map reflecting the difference in transmission efficiency of the gear position of transmission 2, so that the gear position which improves the fuel consumption of the vehicle V can be selected more accurately.

[Shift Transmission Control by the Shift Control Unit 17]

When the vehicle V is currently traveling, the current gear position selection unit 13 always selects an optimal gear position of the transmission 2 in accordance with a change in the travel resistance of the vehicle V. In a case where the vehicle V is traveling on an automobile-only road such as a highway, the forward gear position selection unit 16 estimates an optimal gear position in the forward travel segment determined by the travel segment determination unit 15 while the vehicle V is currently travelling in the current travel segment.

Therefore, when the vehicle V reaches a boundary between the current travel segment and the forward travel segment in a case where the vehicle V is traveling on an automobile-only road such as a highway, a conflict between the current gear position and the forward gear position may be occurred. Since the gear ratio of the direct gear is higher than the gear ratio of the overdrive gear, the rotation speed of the engine 1 in the case of the direct gear is higher even when the speed of the vehicle V is the same. Therefore, for example, when the transmission 2 is shifted from the overdrive gear to the direct gear from the viewpoint of improving the fuel consumption, the driver of vehicle V may get an impression that engine 1 has suddenly blown up.

Therefore, the shift control unit 17 changes, in accordance with various travel environments where the vehicle V is placed, whether or not to shift to the forward gear position when the vehicle V reaches the boundary between the current travel segment and the forward travel segment. The shift transmission control of the transmission 2 by the shift control unit 17, which is performed in accordance with the various traveling environments in which the vehicle V is placed, will be described below.

(First Shift Transmission Control)

It is assumed that the gear position of the transmission 2 in the current travel segment is the overdrive gear and the forward gear position selected by the forward gear position selection unit 16 is the direct gear. The shift control unit 17 downshifts the gear position of the transmission 2 from the overdrive gear to the direct gear when the vehicle V reaches the forward travel segment, on condition that estimated travel time of the vehicle V in the forward travel segment is longer than predetermined time.

Here, the "predetermined time" is "downshift determination reference threshold time", which is referred to in order to determine whether or not the shift control unit 17 downshifts the gear position of the transmission 2 from the overdrive gear to the direct gear at the boundary between the current travel segment and the forward travel segment. A specific value of the downshift determination threshold time may be determined by an experiment in consideration of slope information of a road on which the vehicle V is assumed to travel, performances of the engine 1 provided in the vehicle V, and the like, and is, for example, one minute. This is the time during which the vehicle V traveling at 80 km/h travels approximately 1.3 kin.

The shift control unit 17 prevents the downshift in a case where time for travelling the travel segment where the vehicle V is traveling after downshifting from the overdrive gear to the direct gear is shorter than the predetermined time, that is, in a case where the estimated travel time of the vehicle V is short. As a result, the shift control unit 17 can prevent the driver of the vehicle V from feeling that the shift is repeated in a short time.

As described above, the forward gear position selection unit 16 calculates the travel resistance of the vehicle V based on the weight of the vehicle V, the speed of the vehicle V, the rolling resistance of the vehicle V, and the like, and selects the forward gear position. Here, the forward gear position selection unit 16 may select the direct gear as the best gear, depending on a magnitude of measurement errors of the weight of the vehicle V, the speed of the vehicle V, the rolling resistance of the vehicle V, even in a case where the engine 1 has a low load (for example, in a case where the vehicle V is currently traveling on a flat road).

When the forward gear position selection unit 16 selects the direct gear as the forward gear position according to miscalculation of the travel resistance in a case the where the vehicle V travels on a road whose forward travel segment is flat, an unnecessary downshifting is performed at the boundary of the travel segments. The gear ratio of the direct gear is larger than the gear ratio of the overdrive gear, so that the rotation speed of the engine 1 is increased when the gear position of the transmission 2 is downshifted from the overdrive gear to the direct gear. Since the increase in the rotation speed of the engine 1 may cause a noise, the driving feels of the driver may be impaired.

Therefore, as a condition for downshifting the gear position of the transmission 2 from the overdrive gear to the direct gear when the vehicle V reaches the forward travel segment, the shift control unit 17 may add the fact that road slope in the forward travel segment is an upslope equal to or greater than a predetermined value.

Here, the "upslope equal to or greater than a predetermined value" is a "downshift determination reference threshold slope", which is referred to in order to determine whether or not the shift control unit 17 downshifts the gear position of the transmission 2 from the overdrive gear to the direct gear at the boundary between the current travel segment and the forward travel segment. A specific value of the downshift determination reference threshold slope may be determined by an experiment in consideration of slope information of a road on which the vehicle V is assumed to travel, performances of the engine 1 provided in the vehicle V, and the like, and is, for example, 1%. As a result, it is possible to prevent the driver of the vehicle V from feeling uncomfortable due to unnecessary downshift in the transmission 2.

(Second Shift Transmission Control)

It is assumed that the gear position of the transmission 2 in the current travel segment is the direct gear, and the forward gear position selected by the forward gear position selection unit 16 is also the direct gear. In this case, it is considered that the current gear position selection unit 13 newly selects an upshift to the overdrive gear while the vehicle V is currently traveling in the current travel segment. The shift control unit 17 selects, based on a situation until the vehicle V reaches the forward travel segment, whether or not to cause the transmission 2 to upshift before the vehicle V reaches the forward travel segment.

More specifically, when the estimated time until the vehicle V reaches the forward travel segment is within predetermined time, the shift control unit 17 maintains the gear position of the transmission 2 as the direct gear without upshifting even in a case where the current gear position selection unit 13 newly selects the upshift to the overdrive gear.

Here, the "predetermined time" is "upshift determination reference threshold time", which is referred to in order to determine whether or not the shift control unit 17 upshifts the gear position of the transmission 2 from the direct gear to the overdrive gear in the current travel segment. A specific value of the upshift determination reference threshold time may be determined by an experiment in consideration of slope information of a road on which the vehicle V is assumed to travel, performances of the engine 1 provided in the vehicle V, and the like, and is, for example, one minute, which is the same as the downshift determination reference threshold time. The upshift determination reference threshold time is stored in the storage unit 11.

The shift control unit 17 prevents the upshift in a case where the travel segment where the vehicle V travels after downshifting from the overdrive gear to the direct gear is short, that is, in a case where the estimated travel time of the vehicle V is short. As a result, the shift control unit 17 can prevent the driver of the vehicle V from feeling a busy shift caused by repeated shift in short time.

The shift control unit 17 may determine whether or not to upshift based on a distance condition instead of or in addition to the time condition. Specifically, when the travel distance until the vehicle V reaches the forward travel segment is within a predetermined distance, the shift control unit 17 may maintain the gear position of the transmission 2 as the direct gear even in a case where the current gear position selection unit 13 newly selects the upshift to the overdrive gear.

Here, the "predetermined distance" is "upshift determination reference threshold distance", which is referred to in order to determine whether or not the shift control unit 17 upshifts the gear position of the transmission 2 from the direct gear to the overdrive gear in the current travel segment. A specific value of the upshift determination reference threshold distance may be determined by an experiment in consideration of slope information of a road on which the vehicle V is assumed to travel, performances of the engine 1 provided in the vehicle V, and the like, and is, for example, 1.5 kilometers. This is the distance for which the vehicle V traveling at a speed of 90 kilometer/h travels in one minute. As a result, the shift control unit 17 can prevent the driver of the vehicle V from feeling a busy shift caused by repeated shift in short time. The upshift determination reference threshold distance is stored in the storage unit 11.

(Third Shift Transmission Control)

The vehicle V according to the embodiment has an auto cruise mode in which the engine 1, the transmission 2, and the like are automatically controlled so as to maintain a preset speed of the vehicle V even if the driver of the vehicle V does not operate the accelerator or the shift lever. The speed limit device of the vehicle V controls the engine 1 and the transmission 2 so that the vehicle V travels at the maximum speed without exceeding the set maximum speed. As described above, the vehicle V has a mode in which the vehicle V travels automatically at a predetermined set speed.

The forward gear position selection unit 16 according to the embodiment estimates the travel resistance of the vehicle V on the assumption that the vehicle V is traveling at the set speed. In addition, the forward gear position selection unit 16 refers to a fuel consumption contour map based on the rotation speed N of the engine 1 which is calculated on the assumption that the vehicle V is traveling at the set speed. Here, the speed of the vehicle V is not always equal to the set speed. For example, the vehicle V may temporarily accelerate due to overtaking by the driver of the vehicle V, or the vehicle V may decelerate due to a sudden slope. Therefore, in a case where an assumption of the speed of vehicle V deviates from the actual speed of vehicle V when the forward gear position selection unit 16 selects the forward gear position, the forward gear position may deviate from an optimum gear position in the forward travel segment.

Therefore, the shift control unit 17 changes the gear position of the transmission 2 to the gear position selected by the forward gear position selection unit 16 when the vehicle V reaches the forward travel segment, on condition that a difference between the predetermined set speed and the speed of the vehicle V is within a predetermined range.

Here, the "predetermined range" is a "shift determination reference range", which is referred to in order to determine whether or not the shift control unit 17 changes the gear position of the transmission 2 to the gear position selected by the forward gear position selection unit 16 at the boundary between the current travel segment and the forward travel segment. A specific value of the shift determination reference range may be determined by an experiment in consideration of slope information of a road on which the vehicle V is assumed to travel, performances of the engine 1 provided in the vehicle V, and the like, and is, for example, 5 kilometer/h. That is, the shift control unit 17 changes the gear position to the gear position selected by the forward gear position selection unit 16 on condition that a value, which is obtained by subtracting a hourly speed of the vehicle V from a set hourly speed, falls within ±5. The shift determination reference range is stored in the storage unit 11.

The shift control unit 17 may adopt an auto cruise speed set in the vehicle V as the set speed, or may adopt a speed-limiter speed (speed at which the speed limit device operates) preset in the vehicle V as the set speed. In either case, the speed of the vehicle V is expected as a speed to be adopted when the vehicle V is in the automatic travelling mode. The shift control unit 17 can increase the effectiveness of the forward gear position by performing the shift to the forward gear position on condition that the difference between the set speed and the speed of the vehicle V is within a predetermined range.

(Fourth Shift Transmission Control)

As described above, the current gear position selection unit 13 estimates the travel resistance of the vehicle V from the drive force of the vehicle V, the weight of the vehicle V, and the acceleration of the vehicle V, and selects the gear position with reference to the fuel consumption contour map. The current gear position selection unit 13 may estimate the travel resistance in real time while the vehicle V is currently traveling, and may select the current gear position by reading and referring to a shift pattern, in which a relationship between the speed of the vehicle V and the gear position of the transmission 2 is patterned, from the storage unit 11. In the following description, the aspect that the current gear position selection unit 13 selects the current gear position, which is the gear position of the transmission 2 in the current travel segment, in accordance with the shift pattern determined in advance and stored in the storage unit 11 will be described as a premise.

The shift pattern stored in the storage unit 11 is not based on a general-purpose fuel consumption contour map, and the fuel consumption contour map is not referred to.

Here, it is assumed that the gear position of the transmission 2 in the current travel segment is an overdrive gear and the forward gear position is a direct gear. In a case where the vehicle V ends the traveling in the current travel segment and starts the travelling in the forward travel segment, that is, in a case where the travel segment as a forward travel segment where the shift control unit 17 selects the forward gear becomes the "current travel segment", discords are likely to occur between a current gear selected by the current gear position selection unit 13 and a forward gear selected by the shift control unit 17 in advance. This is because the fuel consumption contour map is not considered in a general-purpose shift map.

Therefore, when the gear position of the transmission 2 in the current travel segment is the overdrive gear and the forward gear position is the direct gear, the shift control unit 17 maintains the gear position of the transmission 2 as the direct gear while the vehicle V is currently travelling in a forward travel segment. The shift control unit 17 downshifts the gear position of the transmission 2 to the direct gear when the vehicle V reaches the forward travel segment, and maintains the gear position of the transmission 2 as the direct gear even if the current gear position selection unit 13 selects the overdrive gear while the vehicle V is currently travelling in the forward travel segment (that is, a current travel segment) during forward gear selection by the forward gear position selection unit 16. As a result, it is possible to prevent the gear position of the transmission 2 from being selected alternately between the current gear position and the pre-selected forward gear position.

The shift control unit 17 can perform the above-described four shift transmission controls from the first shift transmission control to the fourth shift transmission control in any combination. The new shift transmission control generated by the combination has an effect of original shift control.

<Effect of Vehicle Control Device 10>

As described above, according to the vehicle control device 10 of the embodiment, it is possible to improve estimation accuracy of the fuel consumption amount and the technique of selecting the gear position in the vehicle V provided with the AMT. In particular, the forward gear position selection unit 16 according to the embodiment selects the forward gear position with reference to different fuel consumption contour maps in consideration of the difference in gear transmission efficiency, in both a case where the gear position of the transmission 2 is the direct gear and a case where the gear position of the transmission 2 is the normal gear. As a result, the forward gear position selection unit 16 can improve the estimation accuracy of the fuel consumption amount in the vehicle V.

Further, when the vehicle V is traveling on an automobile-only road such as a highway, the shift control unit 17 changes whether or not to shift to the forward gear position selected by the forward gear position selection unit 16 in accordance with various traveling environments where the vehicle V is placed. As a result, an uncomfortable feeling, which can be given to a driver due to the shift of the vehicle V, can be reduced.

The present disclosure have been described using the embodiment, but the technical scope of the present disclosure is not limited to the above-described embodiment and various modifications and changes can be made within the scope of the present disclosure. For example, the specific embodiment of the dispersion and integration of the device is not limited to the above embodiment, and all or a part of the embodiment may be functionally or physically distributed and integrated in optional units. In addition, new embodiments generated by any combination of a plurality of embodiments are also contained in the embodiment of the present disclosure. The effect of the new embodiment caused by the combination has the effect of the original embodiment.

This application is based on Japanese Patent Application (No. 2017-095974) filed on May 12, 2017, the contents of which are incorporated herein by reference.

INDUSTRIAL APPLICABILITY

The vehicle control device according to the present disclosure is useful in improving a technique of selecting the gear position in a vehicle provided with an automated manual transmission.

LIST OF REFERENCE NUMERALS 1 engine
2 transmission
3 GPS sensor
4 weight sensor
5 speed sensor
6 accelerator opening sensor
10 vehicle control device
11 storage unit
12 control unit
13 current gear position selection unit
14 road slope acquisition unit
15 travel segment determination unit
16 forward gear position selection unit
17 shift control unit
V vehicle

The invention claimed is:

1. A vehicle control device that controls operation of a vehicle provided with a transmission,
the transmission includes:
   a direct gear that transmits engine power, which is input via an input shaft, to an output shaft not via a counter shaft, and that directly couples the input shaft to the output shaft; and
   a normal gear that transmits the engine power to the output shaft via the counter shaft, and that includes an overdrive gear having a gear ratio lower than a gear ratio of the direct gear, and
the vehicle control device comprises:
   a travel segment determination unit that determines a forward travel segment ahead of the vehicle in a travelling direction, the forward travel segment having a road slope different from a road slope of a current travel segment where the vehicle currently travels;
   a current gear stage selection unit that selects a current gear position, which is a gear position of the transmission in the current travel segment, in accordance with a pre-defined shift pattern;
   a forward gear position selection unit that selects a forward gear position, which is a gear position of the transmission in the forward travel segment, based on a travel resistance of the vehicle in the forward travel segment estimated based on a road slope of the forward travel segment and a speed of the vehicle; and
   a shift control unit that downshifts a gear position of the transmission to the direct gear when the vehicle reaches the forward travel segment and maintains the gear position of the transmission as the direct gear while the vehicle travels in the forward travel segment, when a gear position of the transmission in the current travel segment is the overdrive gear and the forward gear position is the direct gear,
   wherein the shift control unit maintains the gear position of the transmission as the direct gear even in a case where the current gear stage selection unit selects the overdrive gear while the vehicle travels in the forward travel segment.

2. The vehicle control device according to claim 1, wherein the shift control unit downshifts a gear position of the transmission to the direct gear when the vehicle reaches the forward travel segment, on condition that a road slope in the forward travel segment is an upslope equal to or greater than a predetermined value.

3. The vehicle control device according to claim 1, wherein the travel resistance is estimated in real time while the vehicle is traveling.

* * * * *